(12) United States Patent
Hardy

(10) Patent No.: US 7,154,855 B2
(45) Date of Patent: Dec. 26, 2006

(54) METHOD AND SYSTEM FOR DETERMINING DROPPED FRAME RATES OVER A PACKET SWITCHED TRANSPORT

(75) Inventor: William Christopher Hardy, Dallas, TX (US)

(73) Assignee: MCI, LLC, Basking Ridge, NJ (US)

( * ) Notice: Subject to any disclaimer, the term of this patent is extended or adjusted under 35 U.S.C. 154(b) by 658 days.

(21) Appl. No.: 10/084,013

(22) Filed: Feb. 27, 2002

(65) Prior Publication Data

US 2003/0161306 A1    Aug. 28, 2003

(51) Int. Cl.
*H04J 1/16*  (2006.01)
*H04J 3/14*  (2006.01)
*H04L 12/66* (2006.01)

(52) U.S. Cl. ...................... 370/241; 370/356
(58) Field of Classification Search ............... 370/241, 370/250, 252, 352, 353, 354, 356, 389, 466; 379/10.01, 10.02, 10.03, 23, 34, 27.02, 27.03, 379/27.04
See application file for complete search history.

(56) References Cited

U.S. PATENT DOCUMENTS

| | | | |
|---|---|---|---|
| 5,448,624 A | | 9/1995 | Hardy et al. |
| 5,633,909 A | * | 5/1997 | Fitch ....................... 379/29.01 |
| 5,748,870 A | | 5/1998 | Tims et al. |
| 5,748,876 A | * | 5/1998 | Hardy ........................ 714/25 |
| 5,940,472 A | * | 8/1999 | Newman et al. ......... 379/10.02 |
| 5,963,551 A | * | 10/1999 | Minko ........................ 370/356 |
| 6,208,618 B1 | * | 3/2001 | Kenney et al. ............. 370/216 |
| 6,246,978 B1 | | 6/2001 | Hardy |
| 6,275,797 B1 | * | 8/2001 | Randic ....................... 704/233 |

OTHER PUBLICATIONS

Newton. "Newton's Telecom Dictionary" entry for CELP.*

* cited by examiner

*Primary Examiner*—Huy D. Vu
*Assistant Examiner*—Daniel Ryman

(57) ABSTRACT

The present invention relates to a method for detecting dropped packets in a network that includes a packet switched network. The method includes establishing a telephonic connection between a first network location and a second network location. A set of N waveforms are transmitted from the first network location. Each transmitted waveform includes a waveform characteristic operative to assign a predetermined value relative to other waveforms in the at least one set, such that a predetermined sequence of values are assigned to packets carrying the N transmitted waveforms. A telephonic signal is received at the second network location via the communications channel. The telephonic signal is processed to obtain a received sequence of values. The received sequence of values is compared to the predetermined sequence of transmitted values to detect dropped packets without having access to packet switched network control data.

38 Claims, 3 Drawing Sheets

METHOD AND SYSTEM FOR DETERMINING DROPPED FRAME RATES OVER A PACKET SWITCHED TRANSPORT

BACKGROUND OF THE INVENTION

1. Field of the Invention

The present invention relates generally to testing telecommunications networks, and particularly to detecting dropped packets over a packet switched network.

2. Technical Background

New telecommunications technologies are emerging that employ packet switching instead of, or in addition to, the traditional circuit-switched technologies provided by the public switched telephone networks (PSTN). Providing full duplex voice over the Internet (VoIP) is of particular importance. VoIP services are attractive to commercial long-distance carriers because they enable the use of global Internet transport facilities to carry traffic that is presently being carried over dedicated circuit-switched facilities. The potential benefits are enormous, considering the possibilities for reduction in data exchange capacity required to support a telephone call, opportunities for developing new features and functions for voice services, and the economies of scale from the use of one kind of transport for all telecommunications services. However, a major impediment to the use of VoIP services is concern as to the likely user perception of the quality of full-duplex voice communications using VoIP.

Telephone connections have always been subject to impairments in the form of noise, attenuation, distortion, cross-talk and echo. Such impairments are particularly common to analog portions of the network, such as subscriber loops and frequency domain multiplexing equipment. Digital transmission alleviates many of these problems but also introduces quantization noise and distortions due to bit errors in the digital signal. Even with perfect digital transmission applied to long haul transmissions, a typical telephone connection includes many analog components where impairments can occur. As a result, a poor connection or malfunctioning piece of equipment can produce unacceptably poor reproduction of voice, or conditions on a connection that customers will find objectionable or intolerable. When there is a high incidence of poor connections, the customer may complain to the service provider or to a regulatory authority, or simply change long distance carriers. Thus, perceived quality of telephone connections is a major factor affecting the reputation and marketability of long distance telephone services.

To guard against poor quality, service providers have developed methods to obtain objective quality measurements for a line, piece of equipment, or an end-to-end telephone connection. These measurements can help the service provider detect and gauge impairments, pinpoint weak elements, and correct deficiencies that degrade user perception of quality. As a result, the average consumer has to come to expect a certain quality of service from the PSTN.

With the proliferation of voice-over-packet technologies, maintaining quality of service comparable to the PSTN is a major concern of service providers, equipment vendors, and ultimately the consumers of telecommunications services. Unlike circuit switched traffic, real time voice transmission using packet switched technologies is sensitive to the packet loss, packet delay, and jitter that are characteristic of packet switched networks. In particular, packet loss and packet delay variations may result in transmissions missing some packets, thereby creating an audio signal that is distorted, garbled, or otherwise degraded.

IntServ and Diffserv protocols have been proposed for improving the reliability and consistency of packet transport for packets carrying voice. RTCP (Real Time Transmission Control Protocol) is being deployed to enable real-time measurements of the receipt of packet data, and for reporting the measurements to a sender or to a network quality monitoring location. However, in a hybrid network that includes both a circuit switched network, such as the PSTN and a packet switched network, the detection of dropped packets is problematic, because none of the protocol data is relayed to the end station. The problem, then, is how to measure dropped frame rates codec-to-codec across a packet switched network when there is no access to packet transmission control data. This problem is exacerbated by the fact that dropped frame rates may be manifested in two distinct ways. First, the dropped packet may simply be skipped. If so, the result is a null (a segment of time with no signal energy at all) in the received voice signal. Alternatively, when a packet has not been received in time to maintain a continuous flow of voice, the receiving codec may simply insert the previous packet or a segment of white noise to avoid a null. This packet loss concealment routine results in repetition of speech waveforms or other phenomena that distort speech signals. It also has the effect of disguising the fact that a dropped packet that would have otherwise been revealed by a null was lost. Thus, the presence of nulls will indicate dropped packets, when no packet concealment routine is applied, or the number of dropped packets exceeds the dynamic range of the operant packet loss concealment routine. However, the dropped packets whose occurrence is disguised by a packet loss concealment routine will be more difficult to detect mechanically.

What is needed is a system and method for detecting dropped packets across a packet switched network when there is no access to packet network transmission control data that reliably detects dropped packets, absent any knowledge of whether, or what kind of, a packet loss concealment technique is being used.

SUMMARY OF THE INVENTION

The present invention is directed to a system and method for detecting dropped packets across a packet switched network when there is no access to packed switch transmission control data that reliably detects dropped packets. The present invention also provides a system and method for detecting dropped packets absent any knowledge of whether, or what kind of, a packet loss concealment technique is being used. One aspect of the present invention is a method for detecting dropped packets in a network that includes a packet switched network. The method includes establishing a telephonic connection between a first network location and a second network location. At least one set of N waveforms are transmitted from the first network location. Each transmitted waveform includes a waveform characteristic operative to assign a predetermined value relative to other waveforms in the at least one set, such that a predetermined sequence of values are assigned to packets carrying the N transmitted waveforms. At least one telephonic signal is received at the second network location via the communications channel. The at least one telephonic signal is processed to obtain a received sequence of values. The received sequence of values is compared to the predetermined sequence of transmitted values to detect dropped packets without having access to packet switched network control data.

In another aspect, the present invention includes a system for detecting dropped packets in a telecommunications network including a packet switched network. The system includes a transmission unit configured to send at least one set of N waveforms over the telecommunications network. Each transmitted waveform includes a waveform characteristic operative to assign a predetermined value relative to other waveforms in the at least one set, such that a predetermined sequence of values are assigned to packets carrying the N transmitted waveforms. A receiver unit is operative to receive a telephonic signal from the telecommunications network. The receiver also is configured to derive a received sequence of values from the telephonic signal, and compare the received sequence of values to the predetermined sequence of values to detect dropped packets, without having access to packet switched network transmission control data.

In another aspect, the present invention includes a computer-readable medium having computer-executable instructions for performing a method. The method includes transmitting at least one set of N waveforms from the first network location. Each transmitted waveform includes a waveform characteristic operative to assign a predetermined value relative to other waveforms in the at least one set, such that a predetermined sequence of values are assigned to packets carrying the N transmitted waveforms. At least one telephonic signal is received at the second network location via the communications channel. The at least one telephonic signal is processed to obtain a received sequence of values. The received sequence of values is compared to the predetermined sequence of transmitted values to detect dropped packets without having access to packet switched network control data.

In another aspect, the present invention includes a computer-readable medium having computer-executable instructions for performing a method. The method includes establishing a telephonic connection between a first network location and a second network location. At least one set of N waveforms is transmitted from the first network location. Each transmitted waveform includes a waveform characteristic operative to assign a predetermined value relative to other waveforms in the at least one set, such that a predetermined sequence of values are assigned to packets carrying the N transmitted waveforms.

In another aspect, the present invention includes a computer-readable medium having computer-executable instructions for performing a method. The method includes receiving at least one telephonic signal from a telephonic connection. The at least one telephonic signal is processed to obtain a received sequence of values. The received sequence of values is compared to the predetermined sequence of transmitted values to detect dropped packets without having access to packet switched network control data.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
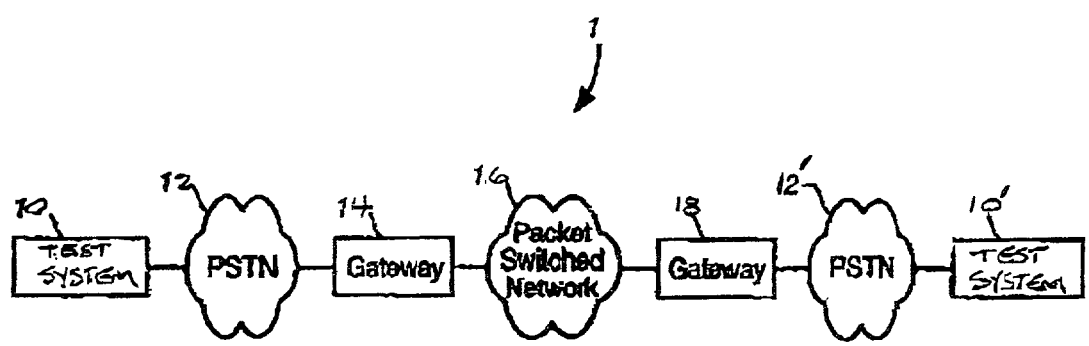
FIG. 1 is a block diagram of a hybrid telecommunications network in accordance with an embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the system of the present invention is shown in FIGS. 1 and 2, and is designated generally throughout by reference numeral 10.

In accordance with the invention, the present invention is directed to a method for detecting dropped packets in a network that includes a packet switched network. The method includes establishing a telephonic connection between a first network location and a second network location. At least one set of N waveforms are transmitted from the first network location. Each transmitted waveform includes a waveform characteristic operative to assign a predetermined value relative to other waveforms in the at least one set, such that a predetermined sequence of values are assigned to packets carrying the N transmitted waveforms. At least one telephonic signal is received at the second network location via the communications channel. The at least one telephonic signal is processed to obtain a received sequence of values. The received sequence of values is compared to the predetermined sequence of transmitted values to detect dropped packets without having access to packet switched network control data. The system and method of the present invention detects dropped packets across a packet switched network when there is no access to packet switch transmission control data, and it is unknown whether packet loss concealment is in effect. Thus, both manifestations of a dropped packet are detected using one test signal. The test signal of at least one sequence of N waveforms is designed so that either nulls or lost packets that are concealed will produce values in the received sequence that differ from the predetermined sequence of transmitted values.

Figure 2:
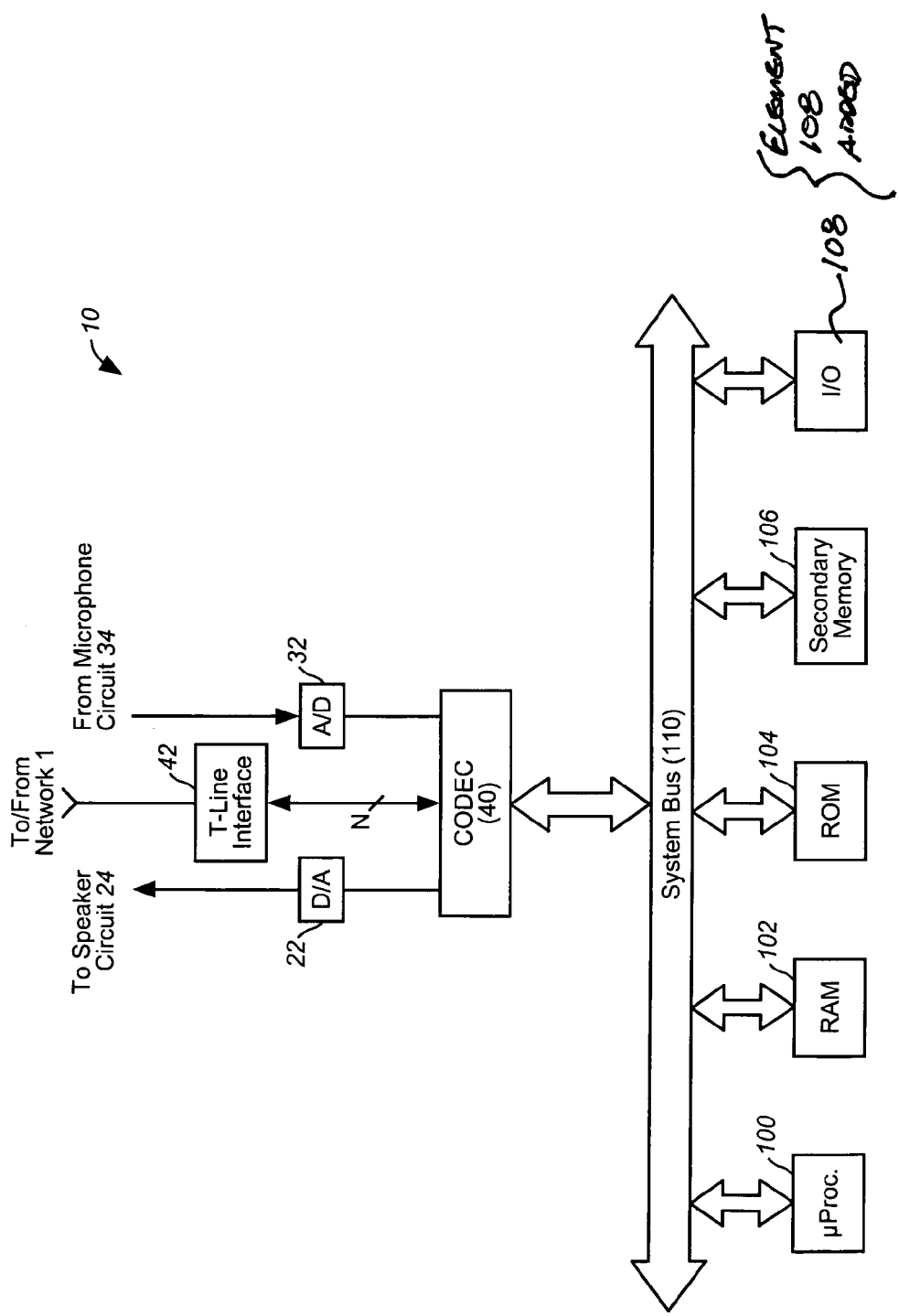
FIG. 2 is a detailed diagram of the test system for determining dropped packets depicted in FIG. 1.

As embodied herein, and depicted in FIG. 1, a hybrid telecommunications network in accordance with the present invention is disclosed. FIG. 1 shows one example of how the present invention may be employed. Test system 10 of the present invention is coupled to public switched telephone network (PSTN) 12. PSTN 12 is coupled to packet switched network 16 by gateway 14. PSTN 12' is coupled to packet switched network 16 by way of gateway 18. Test system 10' is coupled to PSTN 12'. In the example shown in FIG. 1, system 10 initiates a call to system 10' by way of circuit switched PSTN 12. PSTN 12 routes the call to gateway 14. Gateway 14 converts time division multiplexed (TDM) signals into packets that are compatible with packet switched network 16. Gateway 14 has access to a directory of IP addresses of exit gateways. Gateway 14 uses the directory to select gateway 18. Packet switched network 16 transports the packets to gateway 18. Gateway 18 converts the packets back into a TDM format compatible with PSTN 12'. PSTN 12' routes the TDM signal to system 10'. Subsequently, test system 10 transmits a sequence of N test waveforms. System 10' receives the telephonic transmission via network 1, and determines if there are any dropped packets by processing the received waveforms to assign values associated with each waveform, and comparing the assigned values to a predetermined sequence of values. This arrangement provides a method for detecting dropped packets across a packet switched network without having access to packet transmission control data.

Packet switched network 16 is commonly referred to as a converged network. A converged network is adapted to carry various types of media, such as voice, data, and audio or video streams. Each of these media types are digitized and formatted into discrete packets of data. Packet switched network 16 may be of any suitable type, but there is shown by way of example an Internet Protocol (IP) network adapted to carry packet-switched voice, or Voice over the Internet (VoIP). In one embodiment, network 16 is the public Internet which comprises the worldwide collection of interconnected networks that are linked together by the use of the Internet Protocol (IP). This worldwide collection of networks includes a host of networks sponsored by academic, commercial, governmental, and military entities. In another embodiment, packet switched network 16 may include a packet switched network, or a collection of packet switched networks interconnected by a common protocol, not connected to the Internet. An example of such a network would be a privately owned intranet, or enterprise network. In yet another embodiment, network 16 may include both enterprise networks, intranets, and the public Internet.

As embodied herein and depicted in FIG. 2, a detailed diagram of test system 10 is disclosed. System 10 is coupled to network 1 by way of telephone-line interface 42. Telephone-line interface 42 is bi-directionally coupled to codec 40. On the transmit side, a stored waveform is retrieved from memory (either RAM 102 or ROM 104) and provided to codec 40 via system bus 110. Codec 40 encodes the digitized sequence of N waveforms retrieved from memory into an analog signal suitable for insertion to the PSTN via a standard access ioop. The encoded analog signal is provided to interface circuit 42 via the bidirectional connection, and transmitted over network 1. Each transmitted waveform is of a duration that matches the payload of a packet generated in a packet switched network 16 (See FIG. 1). Thus, each transmitted waveform operates to assign a value to a packet carrying the transmitted waveform. Test system 10 also may function as a standard POTS telephone set. In this mode, A/D converter 32 receives voice generated analog signals from telephone headset microphone circuit 34, and D/A converter 22 transmits analog signals to speaker circuit 24.

Analog telephonic transmissions from network 1 are received from interface circuit 42 and provided to codec 40, which creates PCM encoded digital images of the analog signal that is stored in a file in RAM 102. The file includes a digital representation of each of the received waveforms. Processor 100 is programmed to process the stored file to extract the appropriate waveform characteristic for each of the N transmitted waveforms that are received. In one embodiment, processor 100 is programmed to determine the average peak power of each received waveform. The average peak power is converted to a numerical value representing its rank among the average peak powers calculated for the N received waveforms, thereby creating a sequence of received values. The sequence of received values is compared to the sequence of values representing the analogous ranks of the average peak powers among the transmitted set of N waveforms. Since each transmitted waveform operates to assign a value to a packet carrying the transmitted waveform, the sequence of received values indicates which packets successfully traversed the packet switched network 16.

The overall control of system 10 is provided by microprocessor 100. Microprocessor 100 is coupled to RAM 102, ROM 104, secondary memory 106 and I/O circuit 108, by system bus 110. System bus 110 provides the necessary data, address, and control lines. Codec 40 is also coupled to microprocessor 100 by system bus 110.

Telephone line interface 42 may be of any suitable type, but by way of example, interface 12 includes an integrated circuit, such as a Motorola MC3401OP, coupled to isolation transformers. The isolation transformers prevent grounding problems. One of ordinary skill in the art will recognize that the functional block depicted by interface 42 also includes DTMF capabilities.

PCM codec transceiver 40 uses a standard digitization scheme to band limit voice frequencies to the 300-3300 Hz frequency band. Codec 40 performs an A/D conversion of an analog signals using a PCM digitization scheme. In one embodiment for example, the PCM digitization results in a mu-law companded 64 kbps signal wherein larger amplitudes are compressed relative to the smaller amplitudes, providing an equivalent 12-bit accuracy within an 8-bit digital word carrying the values of amplitude sampled at the rate of 8000 Hz. In one embodiment, codec 40 includes a semiconductor IC manufactured by SGS Thompson or by the National Semiconductor Company having the product number ETC5056, or equivalent.

Read/write random access memory (RAM) 102 is used in data processing and data I/O. Read only memory (ROM) 104 is used to store the system 10 programming instructions used by processor 100. Those of ordinary skill in the art will recognize that ROM 104 can be implemented using DRAM, ROM, PROM, or EEPROM. The secondary memory 106 may be implemented using a hard drive, floppy diskettes, CD-ROM, or any other suitable computer readable medium. Programming instructions, waveform generation data, value sequences, and other data associated with the transmission and reception of the various sets of waveforms can be stored using ROM 104 or secondary memory 106.

In one embodiment, processor 100 is implemented using an off-the-shelf microprocessor such as a Pentium processor manufactured by Intel. Those of ordinary skill in the art will also recognize that processor 100 can also be implemented using application specific integrated circuits (ASIC), or a combination of off-the-shelf processors and ASICs in the design. Signal processor 200 may be implemented using any suitable signal processing device such as a digital signal processor (DSP) manufactured by Motorola, or by some other manufacturer.

In one embodiment, I/O circuit 108 supports a computer interface, a display such as a LCD device, and a user interface. The computer interface is adapted to communicate with an external computing device. For example, programming instructions or waveform set data stored in memory 104 can be completely replaced or partially replaced with new instructions down loaded from the external computing device. One of ordinary skill in the art will recognize that data flow is bi-directional. Processor 100 may transfer waveform data or telephonic transmission data to an external device for further processing and/or statistical analysis. The user interface may be of any suitable type, but there is included by way of example a telephone set twelve-key dialing device, a function key set, and a keyboard for data entry and programming functions.

Figure 3:
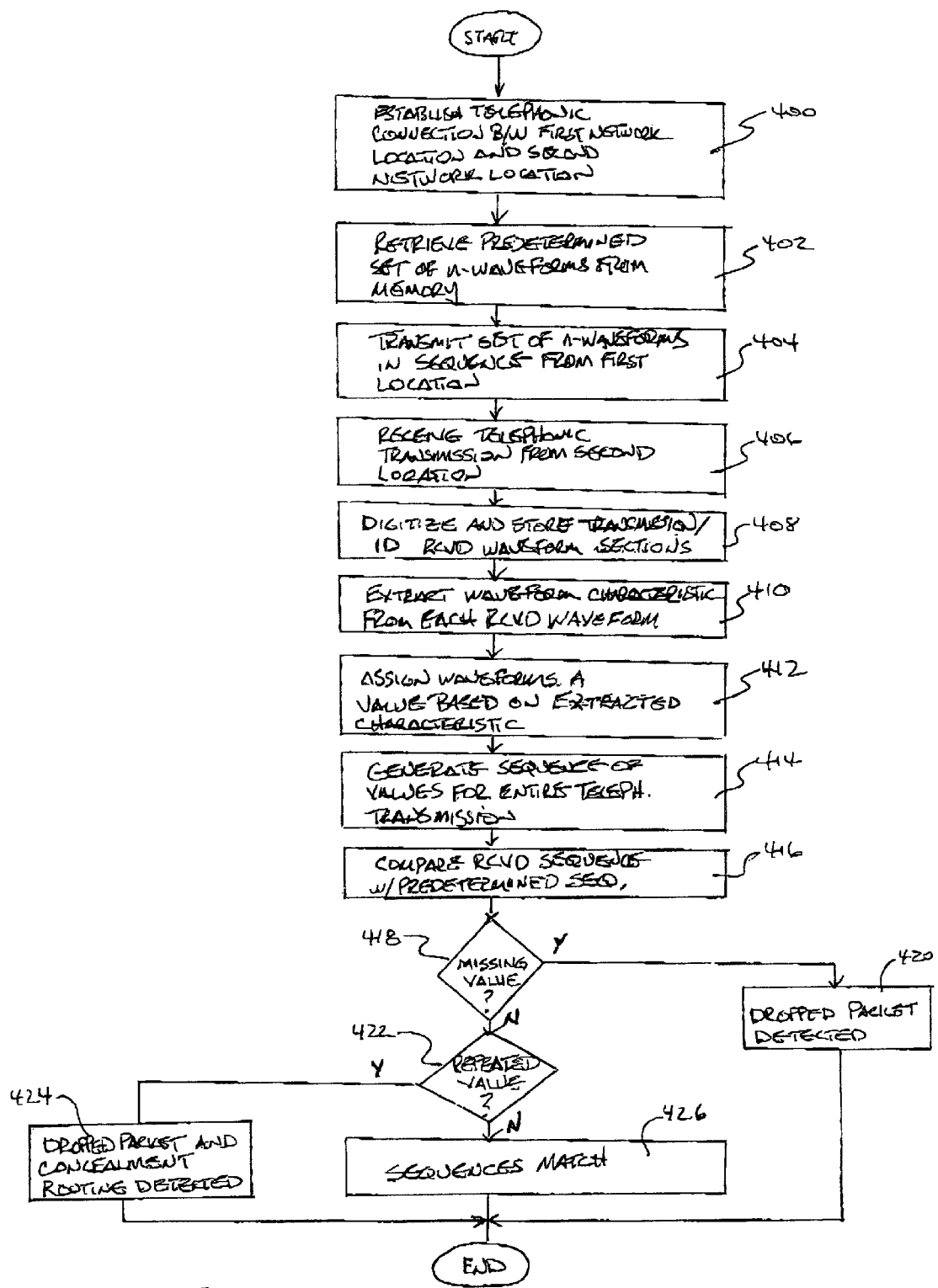
FIG. 3 is a chart showing a method for determining dropped packets in accordance with another embodiment of the present invention.

FIG. 3 is a chart showing a method for determining dropped packets in accordance with another embodiment of the present invention. In step 400, a telephonic connection is established between test system 10 and test system 10'. After retrieving the set of N waveforms from memory in step 402, test system 10 is configured to transmit the set of N waveforms over the telecommunications network in step 404 (N is an integer number). Each waveform possesses a different characteristic operant to distinguish it from the other waveforms in the set of N. The characteristic may be average signal power, peak power, frequency, a number of phase changes per waveform segment, a CELP waveform symbol, a bit-pattern reflected in a semantically encoded waveform, or any other suitable means of encoding a distinctive characteristic in a waveform. The set of N waveforms transmitted by system 10 thereby represents a predetermined sequence of values (1, . . . , N) that index the expected order of the distinguishing characteristics of the N waveforms received and recorded by test system 10'. In one embodiment, each waveform in the set of N includes two waveform segments. The first segment is a sinusoidal wave transmitted at a minimum peak-power level close to a noise floor. The second segment is a sinusoidal wave transmitted at one of N equally spaced power levels between the minimum peak-power level and a maximum peak power level. Thus, the peak power of the second segment functions as the representative waveform characteristic of the transmitted waveform. In the case where N=4, four two-portion waveforms are concatenated and transmitted by system 10 over the telephonic connection. Thus, the transmitted set of N waveforms represents a predetermined sequence of values (1, 2, 3, 4) corresponding to the relative magnitudes of peak power levels of the second segment of each waveform transmitted in sequence. Starting at step 406, the transmission received at test system 10' is processed to produce a corresponding received sequence of values that reveals the occurrence of dropped packets. Test system 10' receives the transmission from system 10. In step 408, the transmission is digitized and stored in memory. During post processing (steps 410–426), the received transmission is divided into waveform sections having a duration substantially equal to each of the transmitted waveforms, i.e., the duration of a voice sample in a packet transmitted across packet switched network 16. A value is assigned to each waveform based on the relative magnitude of the maximum value of average peak power measured over small subdivisions of each waveform in steps 410–412. This produces an integer sequence of values (step 414) associated with the received set of N waveforms that are then compared (step 416) to the predetermined sequence of values encoded by the transmitted set of N waveforms. Deviations (steps 418–424) from the predetermined sequence of values then reveal dropped packets. If a value in the sequence is zero, the receiver recognizes that the packet carrying the expected predetermined value was dropped without concealment. If the section sequence includes a repeated value, e.g., 1, 2, 2, 4, the receiver recognizes that the packet carrying value 3 was dropped and concealed. On the other hand, in step 426, no packets were dropped if the sequences match.

It will be apparent to those of ordinary skill in the pertinent art that modifications and variations can be made to the technique used to encode a predetermined value into a transmitted waveform, depending on the design of both the transmission test sub-system 30 and the receiver test sub-system 20. For example, a value may be encoded in the second segment of a waveform by the number of phase shifts in the second segment. In another embodiment, the value corresponds to the frequency of the transmitted sinusoid.

In yet another embodiment, CELP (Code Excited Linear Prediction) coding is used to encode each predetermined value. CELP coding employs a library, or a table, of waveform symbols. Each waveform symbol has a numerical or alphabetical designation, e.g., symbol 1, symbol 2, symbol 3, and etcetera. On the receive side, processor 100 employs a look-up table to decipher each received CELP waveform. Thus, transmission of waveform symbol 1, waveform symbol 2, waveform symbol 3, and waveform symbol 4 correspond to the predetermined sequence 1, 2, 3, and 4. If a waveform symbol is not present at its expected location within the transmission, the packet carrying the missing symbol was dropped.

In yet another embodiment, semantically encoded waveforms are used to encode the predetermined sequence of values. A waveform having semantic content is transmitted by retrieving a predetermined bit pattern retrieved from memory (RAM 102 or ROM 104) and generating waveforms encoding that bit pattern in accordance with a predetermined data modulation scheme that is fed into codec 40. On the receive side, codec 40 decompresses and decodes the received signal to obtain a bit-pattern. The bit pattern is stored in a file and read by microprocessor 100 during post processing. In this case, the predetermined sequence of values corresponds to a predetermined sequence of bit-patterns which are easily read by microprocessor 100. Reference is made to U.S. Pat. No. 5,748,876, which is incorporated herein by reference as though fully set forth in its entirety, for a more detailed explanation of semantically encoded waveforms.

In all of the above described embodiments, a received telephonic signal is compared to a predetermined sequence of values to detect dropped packets in a packet switched network, without having access to packet switched network transmission control data.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method for detecting dropped packets in a network including a packet switched network, the method comprising:

establishing a telephonic connection between a first network location and a second network location;

transmitting at least one set of N waveforms from the first network location, each transmitted waveform including a waveform characteristic operative to assign a predetermined value relative to other waveforms in the at least one set, such that a predetermined sequence of values are assigned to packets carrying the N transmitted waveforms;

receiving at least one telephonic signal at the second network location via a communications channel;

processing the at least one telephonic signal to obtain a received sequence of values; and comparing the received sequence of values to the predetermined sequence of transmitted values to detect dropped packets without having access to packet switched network control data.

2. The method of claim 1, wherein the representative waveform characteristic is a peak power level.

3. The method of claim 1, wherein the representative waveform characteristic is an average power level.

4. The method of claim 1, wherein each waveform in the set of N waveforms includes a representative waveform characteristic corresponding to one of N peak power levels.

5. The method of claim 4, wherein each of N peak power levels corresponds to a value between 0 and N, such that the predetermined sequence of values is 1, 2, . . . , N.

6. The method of claim 1, wherein the transmitted set of N waveforms comprise a single waveform having a monotonically increasing or decreasing power level.

7. The method of claim 1, wherein each waveform includes a first segment and a second segment.

8. The method of claim 7, wherein the second segment includes the representative waveform characteristic.

9. The method of claim 1, wherein each predetermined value includes a predetermined bit pattern.

10. The method of claim 1, where in the representative waveform characteristic is a waveform corresponding to a CELP symbol.

11. The method of claim 1, wherein the representative waveform characteristic includes a frequency of the waveform.

12. The method of claim 1, wherein the representative waveform characteristic includes a number of phase changes present in a segment of the waveform.

13. The method of claim 1, wherein the representative waveform characteristic includes a semantically encoded waveform.

14. The method of claim 1, wherein the step of processing includes the step of dividing the at least one telephonic signal into received waveform sections having a duration substantially identical to the transmitted waveform.

15. The method of claim 14, wherein the step of processing further comprises:
analyzing each received waveform section to extract a received waveform characteristic;
assigning each received waveform section a received value based on the received waveform characteristic; and
generating a sequence of received values based on the step of assigning to obtain the received sequence of values.

16. The method of claim 15, wherein a deviation between the predetermined sequence of values and the sequence of section values corresponds to a dropped packet.

17. The method of claim 16, wherein a deviation between the predetermined sequence of values and the sequence of section values includes a missing section value, the missing section value corresponding to a dropped packet.

18. The method of claim 16, wherein a deviation between the predetermined sequence of values and the sequence of section values includes a repetition of at least one section value, the repetition corresponding to a dropped packet.

19. The method of claim 16, wherein a deviation between the predetermined sequence of values and the sequence of section values includes a repetition of at least one section value, the repetition indicating a packet loss concealment routine operating in the packet switched network.

20. The method of claim 14, wherein the step of processing further comprises:
comparing each received waveform section to a plurality of CELP waveform patterns;
assigning a symbol number to the received waveform section based on the step of comparing each received waveform section; and
generating a sequence of received values using the symbol numbers of the received waveform sections, to thereby obtain the received sequence of values.

21. The method of claim 14, wherein the step of processing further comprises:
comparing each received waveform section to a plurality of semantically encoded waveform patterns;
assigning a bit-pattern to the received waveform section based on the step of comparing each received waveform section; and
generating a sequence of section values using the bit-pattern of the received waveform sections, to thereby obtain the received sequence of values.

22. A system for detecting dropped packets in a telecommunications network including a packet switched network, the system comprising:
a transmission unit configured to send at least one set of N waveforms over the telecommunications network, each transmitted waveform including a waveform characteristic operative to assign a predetermined value relative to other waveforms in the at least one set, such that a predetermined sequence of values are assigned to packets carrying the N transmitted waveforms; and
a receiver unit operative to receive a telephonic signal from the telecommunications network, the receiver also being configured to derive a received sequence of values from the telephonic signal, and compare the received sequence of values to the predetermined sequence of values to detect dropped packets, without having access to packet switched network transmission control data.

23. The system of claim 22, wherein the transmission unit further comprises:
a computer-readable medium for storing data representing the at least one set of N waveforms;
a processor coupled to the computer readable medium, the processor being programmed to retrieve the data from the computer readable medium; and
a codec device for converting the data into a signal suitable for transmission over the telecommunications network.

24. The system of claim 22, wherein the receiver unit further comprises:
a computer-readable medium;
a codec device for converting a received telephonic signal into digitized data suitable for storing in a file in the computer-readable medium; and
a processor programmed to,
divide the digitized data in the file into received waveform sections,
analyze each received waveform section to extract a received waveform characteristic,
assign each received waveform section a received value based on the received waveform characteristic, and
generate a sequence of received values based on the step of assigning, to thereby obtain the received sequence of values.

25. The method of claim 24, wherein a deviation between the predetermined sequence of values and the sequence of section values corresponds to a dropped packet.

26. The method of claim 25, wherein a deviation between the predetermined sequence of values and the sequence of section values includes a missing section value, the missing section value corresponding to a dropped packet.

27. The method of claim 24, wherein a deviation between the predetermined sequence of values and the sequence of section values includes a repetition of at least one section value, the repetition corresponding to a dropped packet.

28. The method of claim 24, wherein a deviation between the predetermined sequence of values and the sequence of section values includes a repetition of at least one section value, the repetition indicating a packet loss concealment routine operating in the packet switched network.

29. The system of claim 24, wherein the processor is further configured to:
compare each received waveform section to a plurality of CELP waveform patterns;
assign a symbol number to the received waveform section based on the step of comparing each received waveform section; and
generate a sequence of section values using the symbol numbers of the received waveform sections.

30. The system of claim 29, wherein a section waveform characteristic is a waveform corresponding to a CELP symbol.

31. The system of claim 24, wherein the signal processor is further configured to:
compare each received waveform section to a plurality of semantically encoded waveform patterns;
assign a bit-pattern to the received waveform section based on the step of comparing each received waveform section; and
generate a sequence of section values using the bit-pattern of the received waveform sections.

32. The system of claim 31, wherein a section waveform characteristic is a semantically encoded waveform.

33. A computer-readable medium having computer-executable instructions for performing a method, the method comprising:
transmitting at least one set of N waveforms from a first network location, each transmitted waveform including a waveform characteristic operative to assign a predetermined value relative to other waveforms in the at least one set, such that a predetermined sequence of values are assigned to packets carrying the N transmitted waveforms;
receiving at least one telephonic signal at the second network location via a communications channel;
processing the at least one telephonic signal to obtain a received sequence of values; and
comparing the received sequence of values to the predetermined sequence of transmitted values to detect dropped packets without having access to packet switched network control data.

34. A computer-readable medium having computer-executable instructions for performing a method, the method comprising:
establishing a telephonic connection between a first network location and a second network location; and
transmitting at least one set of N waveforms from the first network location, each transmitted waveform including a waveform characteristic operative to assign a predetermined value relative to other waveforms in the at least one set, such that a predetermined sequence of values are assigned to packets carrying the N transmitted waveforms, wherein the transmitted waveforms are used at the second network location to detect dropped packets without having access to packet switched network control data.

35. A computer-readable medium having computer-executable instructions for performing a method, the method comprising:
receiving, from a first network location, at least one telephonic signal at a second network location via a communications channel, wherein the at least one telephonic signal comprises a plurality of waveforms, each of the waveforms including a waveform characteristic operative to assign a predetermined value relative to other waveforms in the at least one telephonic signal;
processing the at least one telephonic signal to obtain a received sequence of values; and
comparing the received sequence of values to a predetermined sequence of transmitted values to detect dropped packets without having access to packet switched network control data.

36. The method of claim 35, wherein the step of processing further comprises:
analyzing each received waveform section to extract a received waveform characteristic;
assigning each received waveform section a received value based on the received waveform characteristic; and
generating a sequence of received values based on the step of assigning to obtain the received sequence of values.

37. The method of claim 35, wherein the step of processing further comprises:
comparing each received waveform section to a plurality of CELP waveform patterns;
assigning a symbol number to the received waveform section based on the step of comparing each received waveform section; and
generating a sequence of received values using the symbol numbers of the received waveform sections, to thereby obtain the received sequence of values.

38. The method of claim 35, wherein the step of processing further comprises:
comparing each received waveform section to a plurality of semantically encoded waveform patterns;
assigning a bit-pattern to the received waveform section based on the step of comparing each received waveform section; and
generating a sequence of section values using the bit-pattern of the received waveform sections, to thereby obtain the received sequence of values.

* * * * *